United States Patent [19]

Fidrych

[11] 4,293,157
[45] Oct. 6, 1981

[54] SPLIT CABLE GRIP CLOSURE AND METHOD OF FORMING SAME

[75] Inventor: Alfred W. Fidrych, Stonington, Conn.

[73] Assignee: Harvey Hubbell Incorporated, Orange, Conn.

[21] Appl. No.: 87,150

[22] Filed: Oct. 22, 1979

[51] Int. Cl.³ .............................................. F16L 3/00
[52] U.S. Cl. .......................... 294/86 CG; 24/115 N; 248/60; 403/373
[58] Field of Search .......................... 294/20, 86 CG; 24/115 R, 115 A, 115 H, 115 N, 205.19; 248/60; 285/235, 236, 305; 403/291, 373

[56] References Cited

U.S. PATENT DOCUMENTS

| | | | |
|---|---|---|---|
| 433,791 | 8/1890 | Jackson | 24/205.19 |
| 2,017,625 | 10/1935 | Kellems | 294/86 CG |
| 2,602,207 | 7/1952 | Kellems | 403/373 |
| 3,216,682 | 11/1965 | Lewis | 248/60 |
| 3,399,853 | 9/1968 | Lewis | 248/60 |
| 3,599,913 | 8/1971 | DiPalma | 248/60 |
| 3,638,987 | 2/1972 | Fidrych | 294/86 CG |

Primary Examiner—Johnny D. Cherry
Attorney, Agent, or Firm—Jerry M. Presson

[57] ABSTRACT

A cable grip adapted to enclose a cable and comprising a split sleeve of open meshed structure with two series of loops along the two free longitudinal edges and a flexible locking member having a central loop and two legs extending from that loop for interconnecting the interfingered series of loops. The central loop is received in two adjacent loops at one end of the two longitudinal edges, and the legs extend through each of the remaining interfingered loops and are coupled together at the other end of these edges. To form the closure for the split sleeve, the sleeve is first wrapped around the cable so that the two series of loops are interfingered except for two adjacent loops at the top end, a rigid pin is maneuvered through all but the two top loops, the flexible locking member is maneuvered through these top loops and secured to the pin, and the pin is withdrawn, pulling the locking member with it through the remaining loops. Then, the locking member is released from the pin and is fastened in place.

18 Claims, 10 Drawing Figures

SPLIT CABLE GRIP CLOSURE AND METHOD OF FORMING SAME

FIELD OF THE INVENTION

The present invention relates to cable grips for drawing, holding and supporting cables and other flexible conduits. More particularly, the present invention relates to a split cable grip formed of an open mesh structure with a flexible locking member interconnecting the free longitudinal edges of the mesh structure, and also to the method of interconnecting these edges.

BACKGROUND OF THE INVENTION

Cable grips for drawing, holding and supporting cables and other flexible conduits, especially electrical cables, are well known in the art. These devices include a tubular body formed from interwoven wire strands which may be expanded radially by endwise compression to enable them to readily receive the cable and radially contracted to frictionally engage the periphery of the cable. Subsequently applied forces tending to separate the grip from the cable cause a firmer grip on the cable. Such open mesh structures in tubular form are readily usable at the end of a cable since they can merely be slipped on to the end.

However, when it is necessary to place a cable grip on a cable at a position distant from the end, a split cable grip is utilized in which the open mesh structure is in the form of a split sleeve with a locking means being provided to close the longitudinal edges forming the split in the sleeve.

Such locking means in the past have included leather thongs, wire lacing, rigid rods or metal clips. An example of such wire lacing is shown in U.S. Pat. No. 3,638,987, issued on Feb. 1, 1972 to Fidrych in which each leg of the lace passes through alternate loops in the mesh structure in a precise under-and-over weaving. In addition, such a locking means can be formed from a rigid pin passing through two series of opposed loops on the longitudinal edges of the split sleeve, as shown in U.S. Pat. No. 2,602,207, issued on July 8, 1952 to Kellems.

Unfortunately, these prior art locking means have significant disadvantages which become especially apparent when viewed in the environment in which the split sleeve cable grips are utilized. In particular, many of these grips are used to support electrical cables extending from the bottom floor to the top floor of a building in which the cable is hung in a shaft provided for such a purpose. Quite commonly, there are a number of such cables, often 10 or 15, which, in larger buildings can extend vertically for more than 1,000 feet. These cables must be supported at various intervals provided by local building codes, such intervals not uncommonly being every 50 feet. Thus, in installing a very long cable in a tall building, more than 10-15 of these cable grips must be installed for each cable.

Typically, the split sleeve is placed about the cable from access areas for the shaft containing the cables. Thus, there is very little room to work with the cable and the split sleeve.

In addition, the manufactured split sleeves are dimensioned so they fit a variety of cable diameters. One particular size split sleeve then must be large enough to fit over the cable when axially compressed but must be small enough so that axial tension will radially reduce the sleeve sufficiently to provide a positive gripping action.

In those situations when the cable diameter is at the maximum width for a given sleeve, there is very little clearance between the inner diameter of the sleeve and the outer diameter of the cable. This complicates closure of the sleeve since there is less "play" between the cable and the sleeve and also requires constant compression of the sleeve about the cable.

Thus, the installing job is time consuming and frustrating to the installer who must meticulously wrap numerous grips in cramped spaces.

It is thus quite obvious that ease of assembly of the cable grip and a permanent connection to the cable are quite important. Leather thongs and wire laces have been found unsatisfactory because it takes considerable time to lace the edges of the grip together and, even when the edges are fully laced, sufficient strength is not always provided to hold the edges of the grip together properly. The metal wire lacing, usually being braided and unresilient, is quite easily kinked and tends to cut the hands of the installer. These laces must be very precisely woven in an under-and-over configuration and it is often the case that impatient installers tend to leave some of the weaving of the loops undone. Moreover, quite often, to provide a proper connection, the operation must be done by two people, one to axially compress the mesh sleeve and the other to weave the lace. If compression is not applied in an adequate amount, the lace is not tight enough and the cable grip can slip. Moreover, in many of these wire mesh cable grips the bottom series of loops are closer together, making the lacing operation at that part very difficult. Complicating all of this is the fact that the cable usually comes from a reel upon which it is initially supported so that the unraveled cable tends to be sinuous and therefore it is difficult to wrap a split sleeve thereabout and lace it up.

Some of these disadvantages are overcome by utilizing the pin-type locking means disclosed in U.S. Pat. No. 2,602,207, since the locking is accomplished more quickly; however, there are still some improvements necessary in such a cable grip. In particular, the rigid rod does not closely conform to the outer configuration of the cable, so that when under tension the radial compressive forces are restricted, thereby sometimes allowing the grip to slip. In addition, the rigid rod is not flexible so that it becomes extremely difficult to install onto a cable with any degree of curvature along its longitudinal axis. Because of the reduction in gripping ability due to the rigid rod, such cable grips are usually recommended for temporary or light duty use only.

OBJECTS OF THE INVENTION

Accordingly, it is a primary object of the present invention to overcome the limitations and drawbacks associated with the prior art devices and to provide a new and improved split cable grip for supporting cable.

Another object of the present invention is to provide a split cable grip which is easily and quickly assembled by one operator.

Another object of the present invention is to provide a split cable grip with a locking means which results in a permanent grip, which is as flexible as the split mesh itself forming the remaining part of the cable grip.

Another object of the present invention is to provide a fast method of forming a closure for a split cable grip and to provide a unique pin for use during such method.

The foregoing objects are basically attained by providing a cable grip comprising a tubular body portion comprising a split sleeve adapted to enclose a cable and formed of a plurality of flexible, elongated members interwoven to form an open mesh structure with two series of loops, one series along each longitudinal edge of the split sleeve, the meshed structure of the body portion being capable of varying in a radial direction to increase and decrease the cross-sectional area enclosed thereby, the two series of loops being longitudinally aligned and interfingered except for two adjacent end loops at one end of the two longitudinal edges, and a locking mechanism for interconnecting the two series of loops, the locking mechanism comprising a flexible locking member coupling the two adjacent end loops together and extending through each of the remaining longitudinally aligned and interfingered loops, the flexible locking member comprising two elongated elements, both of which extend through each of the remaining longitudinally aligned and interfingered loops in a side-by-side relationship.

Preferably, the locking member is formed from an integral, elongated member, such as a filament or a strand formed of a plurality of filaments, which has a central loop received in the two adjacent end loops and two elongated legs extending from the loop through each of the remaining longitudinally aligned and interfingered loops in a side-by-side relationship, the legs being coupled together at the bottom end of the split sleeve.

Advantageously, the flexible locking member can be very quickly drawn into a locking position by first wrapping the split sleeve around the cable so that the two series of loops on the longitudinal edges are adjacent, maneuvering the rigid pin through all but the two top loops, maneuvering the flexible locking member through these two top loops and securing its ends to the pin, and withdrawing the pin through the remaining loops, thereby pulling the locking member with it.

A pin for use in such a method advantageously comprises an elongated body in the form of a rod having a bent, thin end with two apertures therein for receiving the ends of the locking member.

By so providing such an apparatus, it is estimated that a split cable grip can be installed around a cable in about one minute in which the grip has about 17 loops on a side, whereas the old lacing method would probably take more than 20 minutes.

Since the locking member is flexible, it does not interfere with the outward expansion and inward compression of the interwoven mesh structure so that a strong and permanent gripping is provided.

Other objects, advantages and salient feature of the present invention will become apparent from the following detailed description which, taken in conjunction with the annexed drawings, discloses a preferred embodiment of the present invention.

DRAWINGS

Referring now to the drawings which form a part of this original disclosure:

Figure 8:
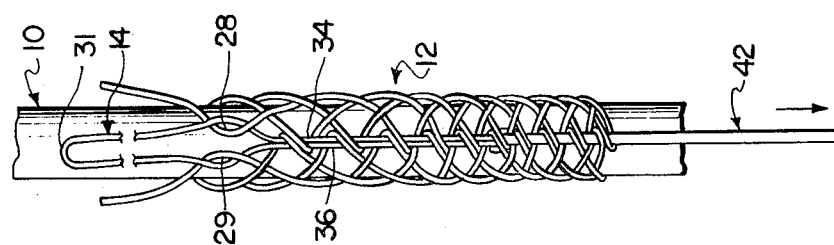
FIG. 8 is a fragmentary, front elevational view similar to that seen in FIG. 7 except that the pin has been pulled from the position shown in FIG. 7 to a position about two-thirds down the longitudinal length of the split sleeve, drawing the locking member therewith.
Figure 9:
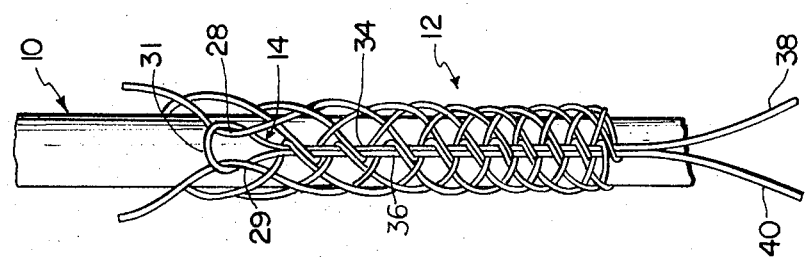
Figure 10:
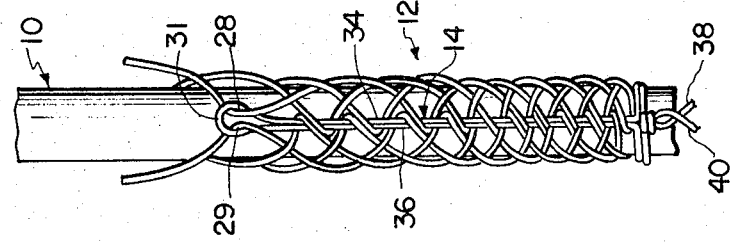

FIG. 9 is a fragmentary, front elevational view similar to that seen in FIG. 8 except that the pin has been pulled completely outward from the interfingered loops, thereby pulling the locking member therethrough and the pin has been disengaged from the locking member; and FIG. 10 is a fragmentary, front elevational view similar to that shown in FIG. 9 except that the locking member has been pulled tightly downwardly so that the central loop has pulled the two top adjacent end loops together and has also been wrapped around the cable and twisted onto itself.

DETAILED DESCRIPTION OF THE INVENTION

Referring first to FIG. 10, the apparatus of the present invention is specifically illustrated and includes an electrical cable or conduit 10 gripped by a cable grip formed by a split sleeve 12 and a flexible locking member 14 in the form of an elongated filament or strand.

Figure 1:
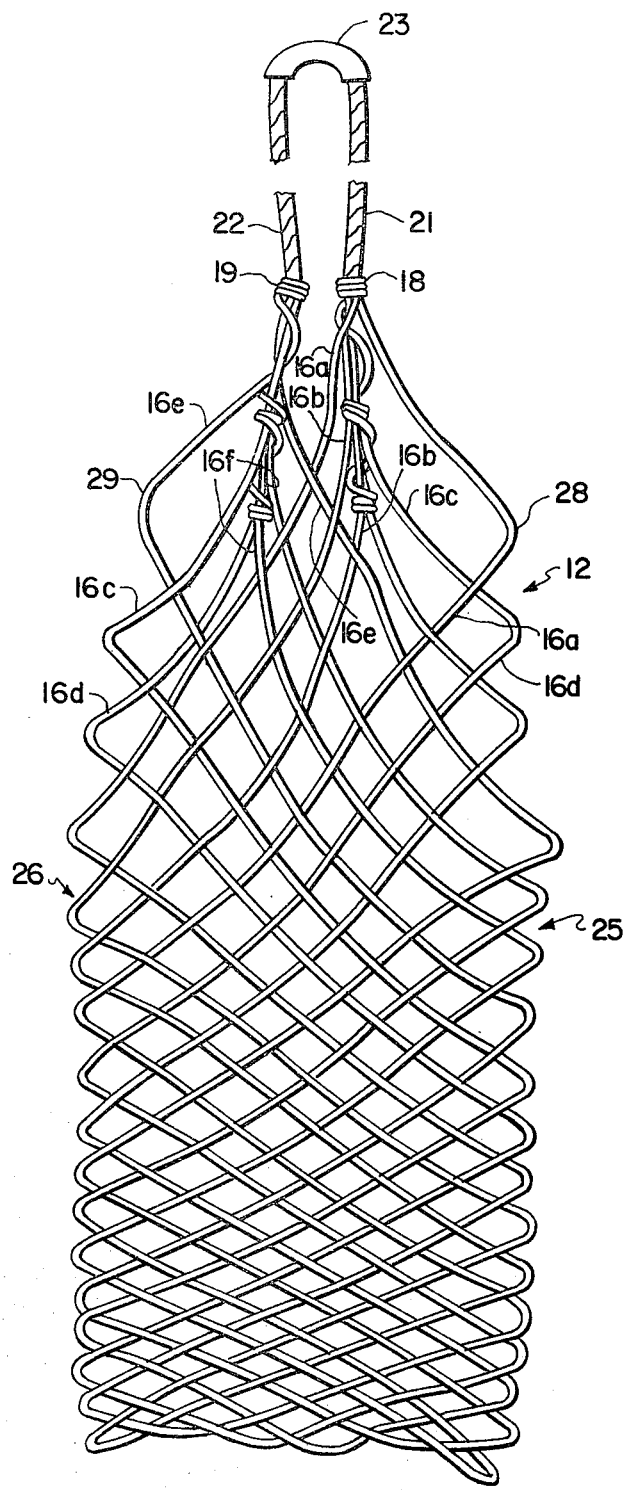
FIG. 1 is a front elevational view of a split sleeve open mesh cable grip of conventional type in the open position for use in the present invention.

This split sleeve 12, which is conventional, is shown more clearly in enlarged fashion in FIG. 1 and comprises an open mesh structure formed of a plurality of flexible, elongated members 16a–16f which are interwoven to form the mesh structure. These elongated members can be formed from plastic or metal and can be in the form of a single filament or a plurality of filaments forming a strand. When the edges of the mesh structure are connected to form a tubular body portion, the structure is capable of varying in a radial direction to increase and decrease the cross-sectional area enclosed thereby. Thus, a longitudinal pull on the structure tends to reduce the cross-section, resulting in the gripping action.

The elongated members 16a–16f are gathered in two separate tubular supports 18 and 19 and are then stranded thereabove, these two strands 21 and 22 being coupled together in a sleeve 23.

On the two longitudinal side edges of the mesh structure are two series of loops 25 and 26. As seen in FIG. 1, the spacing between these loops decreases from the top or draft end of the split sleeve 12 near supports 18 and 19 to the bottom thereof. Alternatively, the spacing of the loops can be that as shown in U.S. Pat. No. 3,638,987 in which the central portion of the split sleeve has the loops closer together.

At the top end of the series of loops 25 is a top loop 28 and at the top of the series of loops 26 is a top loop 29.

As seen in FIGS. 4 and 7-10, the locking member 14 is comprised of an integral elongated piece of material which can be a filament or a plurality of filaments forming a strand, comprised of plastic or metal, and which is flexible.

The locking member comprises a central element or loop 31 and two elongated elements or legs 34 and 36 extending integrally from the central loop 31.

Leg 34 has a distal end portion 38 and leg 36 has a distal end portion 40.

As seen in FIGS. 2, 3, 4, 6, 7 and 8, a pin 42 is utilized to form the closure of the split sleeve 12 in conjunction with the locking member 14.

Figure 2:
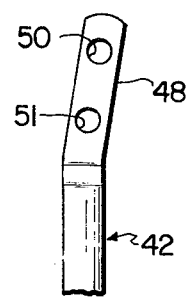
FIG. 2 is a fragmentary, front elevational view of the end of the pin used to form the cable grip closure in accordance with the present invention.
Figure 3:
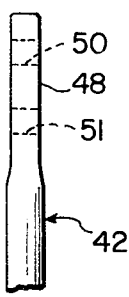
FIG. 3 is a fragmentary, right side elevational view of the pin shown in FIG. 2.
Figure 4:
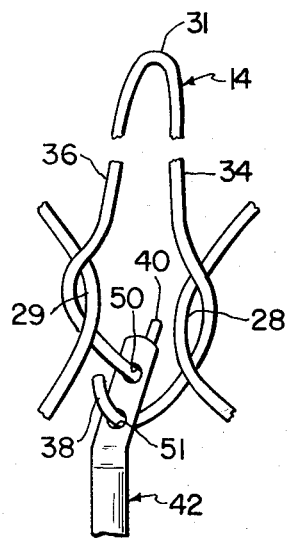
FIG. 4 is a fragmentary, front elevational view showing the end of the pin seen in FIG. 2 having the ends of the locking member releasably engaged therewith and also received in the two end loops of the split sleeve.

The pin itself is comprised of a rigid elongated rod 44 having a circular cross section, a handle 46 located at a first end portion and a thinner, locking member receiving portion 48, best seen in FIGS. 2 and 3, at the other end, this receiving portion 48 being bent out of the longitudinal axis of the rod 44 and being tapered from the portion of the rod adjacent thereto so that it has a thinner width. Two spaced apertures 50 and 51 pass completely through the receiving portion 48, as best seen in FIGS. 2-4. These apertures releasably receive and engage respectively the ends 38 and 40 of the locking member 14, as seen in FIG. 4. Preferably, the diameter of these circular apertures is just slightly greater than the outer diameter of the locking member to provide a somewhat snug fit therebetween.

METHOD OF FORMING THE CLOSURE

Figure 5:
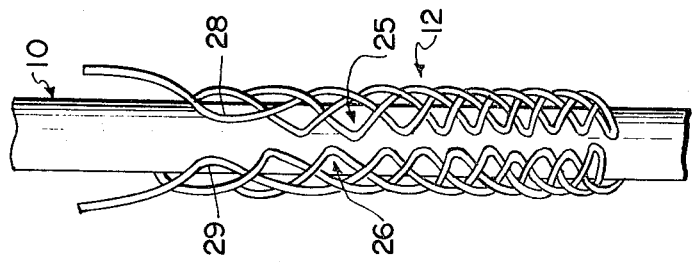
FIG. 5 is a fragmentary, front elevational view showing a split sleeve wrapped about a cable, the split sleeve being substantially the same as that shown in FIG. 1 except that it is reduced in size and has only 11 loops on a longitudinal edge rather than the 17 loops shown in FIG. 1 for the sake of simplicity.

In order to apply and attach the meshed structure shown in FIG. 1 to an electrical cable 10, the split meshed structure is wrapped around the cable so that the two series of loops 25 and 26 are adjacent each other as seen in FIG. 5, thereby forming a tubular body portion.

Figure 6:
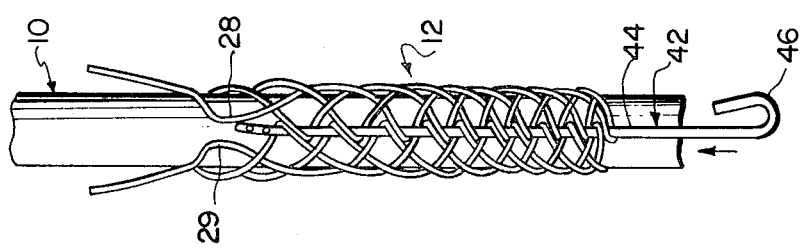
FIG. 6 is a fragmentary, front elevational view similar to that seen in FIG. 5 except that the pin has been maneuvered through the interfingered loops on the two longitudinal edges of the split sleeve except for the two adjacent end loops at the top of the split sleeve.

Then, the pin 42 is maneuvered so that the bent end having apertures 50 and 51 therein is moved into the bottom-most loop on the mesh structure and then moved alternately upwardly through successive ones of the adjacent loops except for the last two adjacent top loops 28 and 29, thereby interfingering all but two of the loops as seen in FIG. 6. This is accomplished by pushing the pin 42 from the bottom end of the mesh structure upwardly toward the top and simultaneously rotating the pin so that the bent portion 48 can alternately pass through the aligned loops on the two adjacent longitudinal edges.

Figure 7:
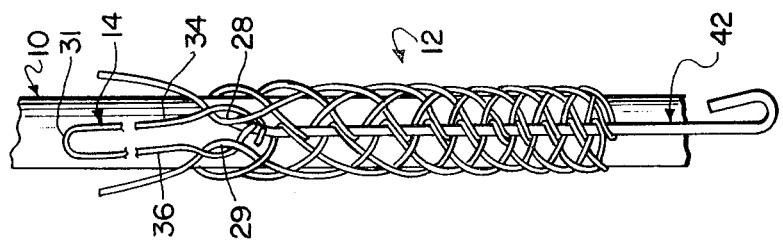
FIG. 7 is a fragmentary, front elevational view similar to that seen in FIG. 6 except that the locking member ends have passed through the two adjacent end loops and are releasably engaged with the apertures at the end of the pin.

Once the pin 42 is in the position shown in FIG. 6, the two ends 38 and 40 of the flexible locking member 14 are moved respectively through the two adjacent top loops 28 and 29, as seen in FIG. 7, and these ends 38 and 40 are respectively passed through apertures 51 and 50 in the pin 42 and bent backwards against the pin, as seen in FIG. 4 thereby releasably engaging the ends with the pin.

The next step comprises pulling the pin 42 downwardly of the mesh structure back through the interfingered loops and, thereby, pulling the engaged locking member through these interfingered loops, as seen in FIG. 8 in which position the pin 42 is about two-thirds along its downward movement.

As this movement is continued, the two legs 34 and 36 of the locking member are pulled through these aligned and interfingered loops in a side-by-side relationship and, once the pin is completely through the bottommost loop of the mesh structure, both these legs extend completely through each of the remaining loops and are received therein.

At this time, the two ends 38 and 40 of the locking member are disengaged from the pin 42, as seen in FIG. 9, and these two ends are wrapped about the cable 10 and then twisted about themselves to provide a fastening thereof, as seen in FIG. 10.

Thus, the open mesh structure is quickly and easily closed by means of the pin 42 and the associated locking member 14. Since the locking member is flexible, the resulting cable grip can expand and contract to provide the required gripping action.

While one advantageous embodiment has been chosen to illustrate the invention, it will be understood by those skilled in the art that various changes and modifications can be made therein without departing from the scope of the invention as defined in the appended claims.

What is claimed is:

1. A cable grip comprising:
   a tubular body portion comprising a split sleeve adapted to enclose a cable and formed of a plurality of flexible, elongated members interwoven to form an open mesh structure with two series of loops, one series along each longitudinal edge of said split sleeve,
   said mesh structure of said body portion being capable of varying in a radial direction to increase and decrease the cross-sectional area enclosed thereby,
   said two series of loops being longitudinally aligned and interfingered except for two adjacent end loops at one end of said two longitudinal edges; and
   locking means for interconnecting said two series of loops,
   said locking means comprising a flexible locking member coupling said two adjacent end loops together and extending through each of the remaining longitudinally aligned and interfingered loops,
   said flexible locking member comprising two elongated elements, both of which extend through each of the remaining longitudinally aligned and interfingered loops in a side-by-side relationship.

2. A cable grip according to claim 1, wherein said two elongated elements are coupled together by a central element.

3. A cable grip according to claim 2, wherein said central element is received by said two adjacent end loops.

4. A cable grip according to claim 2, wherein said central element and said two elongated elements are integrally formed.

5. A cable grip according to claim 2, wherein said two elongated elements are coupled together after passing through each of the remaining loops.

6. A cable grip comprising:
   a tubular body portion comprising a split sleeve adapted to enclose a cable and formed of a plurality of flexible, elongated members interwoven to form an open mesh structure with two series of loops, one series along each longitudinal edge of said split sleeve, said mesh structure of said body portion being capable of varying in a radial direction to increase and decrease the cross-sectional area enclosed thereby, said two series of loops being longitudinally aligned and interfingered except for two adjacent end loops at one end of said two longitudinal edges; and locking means for interconnecting said two series of loops, said locking means comprising a flexible locking member having a central loop and two legs extending from said central loop, said central loop being received in said two adjacent loops at one end of said two longitudinal edges, said two legs extending through each of the remaining longitudinally aligned and interfingered loops in a side-by-side relationship, the ends of said legs being coupled together at the second end of said edges.

7. A cable grip according to claim 6, wherein said flexible locking member is formed of a single filament.

8. A cable grip according to claim 7, wherein said filament is formed of metal.

9. A cable grip according to claim 7, wherein said filament is formed of plastic.

10. A cable grip according to claim 6, wherein said flexible locking member is a strand formed of a plurality of filaments.

11. A cable grip according to claim 10, wherein said strand is formed of metal.

12. A cable grip according to claim 10, wherein said strand is formed of plastic.

13. A method of joining two edges of a split mesh cable grip formed from interwoven elongated members, each of the edges comprising a plurality of loops, the steps comprising wrapping the split mesh cable grip around a cable so that the loops of the two edges are adjacent, maneuvering a rigid pin from one end of the edges alternately through successive ones of the adjacent loops except for the last two adjacent loops at the second end, thereby interfingering all but two of the loops, maneuvering the two ends of a flexible locking member respectively through the two adjacent loops at the second end, releasably engaging the two ends of the flexible locking member with the pin, pulling the pin completely outward of the interfingered loops and, thereby, the engaged locking member through these interfingered loops, disengaging the two ends of the locking member from the pin, and fastening the two ends of the locking member to prevent relative movement thereof.

14. A method according to claim 13, wherein the second maneuvering step comprises rotating the rigid pin.

15. A method according to claim 13, wherein the second maneuvering step comprises moving the rigid pin from one end of the spit mesh cable grip to the second end.

16. A method according to claim 13, wherein the releasably engaging step comprises maneuvering the two ends of the locking member through at least one aperture provided in the pin and bending the locking member back on itself adjacent the two ends.

17. A method according to claim 13, wherein the fastening step comprises twisting the locking member about itself.

18. A method according to claim 17, wherein the fastening step is preceded by the step of wrapping the locking member about the cable.

* * * * *